United States Patent
Har-Zion et al.

(10) Patent No.: US 11,102,790 B2
(45) Date of Patent: Aug. 24, 2021

(54) DYNAMICALLY CONFIGURABLE WIRELESS DEVICE SUPPORTING MULTIPLE CONCURRENT FREQUENCY BANDS

(71) Applicant: Celeno Communications (Israel) Ltd., Raanana (IL)

(72) Inventors: Yuval Har-Zion, Kadima (IL); Tsahi Tal, Tel-Mond (IL); Albert Rapaport, Shoham (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 0 days.

(21) Appl. No.: 16/554,672

(22) Filed: Aug. 29, 2019

(65) Prior Publication Data

US 2020/0077412 A1    Mar. 5, 2020

Related U.S. Application Data

(60) Provisional application No. 62/726,328, filed on Sep. 3, 2018.

(51) Int. Cl.
*H04W 72/08* (2009.01)
*H04L 12/725* (2013.01)
(Continued)

(52) U.S. Cl.
CPC ......... *H04W 72/082* (2013.01); *H04L 5/0062* (2013.01); *H04L 45/302* (2013.01);
(Continued)

(58) Field of Classification Search
None
See application file for complete search history.

(56) References Cited

U.S. PATENT DOCUMENTS

| | | | |
|---|---|---|---|
| 2009/0110088 A1* | 4/2009 | Di Giandomenico | ....................... H04L 12/2856 375/260 |
| 2013/0070688 A1* | 3/2013 | Picker | .................. H04B 7/0689 370/329 |

(Continued)

FOREIGN PATENT DOCUMENTS

| | | |
|---|---|---|
| CN | 203554421 U | 4/2014 |
| EP | 1708520 B1 | 12/2010 |
| EP | 1833270 B1 | 3/2013 |

OTHER PUBLICATIONS

International Application # PCT/IB2019/057286 search report dated Nov. 28, 2019.

(Continued)

*Primary Examiner* — Jamaal Henson
(74) *Attorney, Agent, or Firm* — Kligler & Associates Patent Attorneys Ltd

(57) ABSTRACT

A wireless device includes multiple RF chains, one or more processing modules, a switching circuit and a processor. The RF chains operate in multiple RF bands, and at least one RF chain is configurable to operate at a RF band selected from the RF bands. The processing modules are configurable to process signals communicated with the RF chains. The switching circuit routes signals between RF chains and processing modules in accordance with a routing plan. In response to an event that warrants reconfiguration, the processor re-allocates resources, including (i) allocating one or more RF chains to respective RF bands, (ii) allocating one or more processing modules to process signals associated with the RF bands, and (iii) setting the routing plan to route signals between pairs of RF chains and processing modules allocated to a common RF band. The processor communicates wirelessly with remote devices in accordance with the operational reconfiguration.

12 Claims, 3 Drawing Sheets

(51) Int. Cl.
*H04L 5/00* (2006.01)
*H04W 40/04* (2009.01)
*H04W 72/04* (2009.01)
*H04W 36/26* (2009.01)
*H04W 84/12* (2009.01)

(52) U.S. Cl.
CPC ........... *H04W 36/26* (2013.01); *H04W 40/04* (2013.01); *H04W 72/0453* (2013.01); *H04W 84/12* (2013.01)

(56) References Cited

U.S. PATENT DOCUMENTS

| | | |
|---|---|---|
| 2013/0272227 A1 | 10/2013 | Gallagher et al. |
| 2013/0336242 A1* | 12/2013 | Rajagopal ................ H04L 5/00 370/329 |
| 2014/0064341 A1* | 3/2014 | Johansson ............ H04B 1/0067 375/219 |
| 2015/0085944 A1* | 3/2015 | Mobasher ............ H04B 7/0413 375/267 |
| 2015/0358055 A1* | 12/2015 | Molisch ............... H04B 7/0413 370/329 |
| 2018/0110007 A1 | 4/2018 | Park et al. |

OTHER PUBLICATIONS

IEEE P802.11n, IEEE Standard for information technology—Telecommunications and information exchange between systems—Local and metropolitan area networks—Specific requirements, Part 11: Wireless LAN Medium Access Control (MAC) and Physical Layer (PHY) specifications, Amendment 5,: Enhancements for higher Throughput, pp. 1-536, year 2009.

IEEE Std 802.11ac™, IEEE Standard for Information technology—Telecommunications and information exchange between systems Local and metropolitan area networks—Specific requirements, "Part 11: Wireless LAN Medium Access Control (MAC) and Physical Layer (PHY) Specifications Amendment 4: Enhancements for Very High Throughput for Operation in Bands below 6 GHz", pp. 1-425, year 2013.

* cited by examiner

DYNAMICALLY CONFIGURABLE WIRELESS DEVICE SUPPORTING MULTIPLE CONCURRENT FREQUENCY BANDS

CROSS-REFERENCE TO RELATED APPLICATIONS

This application claims the benefit of U.S. Provisional Patent Application 62/726,328, filed Sep. 3, 2018, whose disclosure is incorporated herein by reference.

TECHNICAL FIELD

Embodiments described herein relate generally to wireless communication, and particularly to methods and systems for dynamic reconfiguration of a wireless device communicating concurrently over multiple frequency bands.

BACKGROUND

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput," 2009; and in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013; WLANs are also commonly referred to as Wi-Fi networks.

SUMMARY

An embodiment that is described herein provides a wireless device that includes multiple Radio Frequency (RF) chains, one or more processing modules, a switching circuit and a processor. The multiple RF chains operate in multiple respective predefined RF bands, wherein at least one RF chain is configurable to operate at a RF band selected from among the multiple predefined RF bands. The one or more processing modules are configurable to process baseband signals communicated with the multiple RF chains. The switching circuit is configured to route baseband signals between the RF chains and the processing modules, in accordance with a switch routing plan. The processor is configured to, in response to an event that warrants an operational reconfiguration of the wireless device, re-allocate resources of the wireless device including (i) allocating one or more of the RF chains to operate at one or more respective RF bands, (ii) allocating one or more of the processing modules to process baseband signals associated respectively with the one or more RF bands, and (iii) setting the switch routing plan to route baseband signals between pairs of RF chains and processing modules that were allocated to a common RF band, and to communicate wirelessly with one or more remote devices in accordance with the operational reconfiguration.

In some embodiments, the processor is configured to re-allocate the resources of the wireless device during field operation of the wireless device. In other embodiments, the processor is configured to re-allocate the resources by modifying a number of RF chains allocated to a given RF band. In yet other embodiments, the processor is configured to re-allocate the resources by re-allocating a given RF chain from a first RF band to a second different RF band.

In an embodiment, the one or more processing modules share a pool of multiple processing units, and the processor is configured to re-allocate a given processing unit from a first processing module to a second different processing module. In another embodiment, the wireless device communicates with the one or more remote devices in a beamforming mode, and the processor is configured to re-allocate the resources, by modifying a number of RF chains allocated to a given RF band for producing a desired beamformed transmission pattern. In yet another embodiment, the event includes identifying degradation in a quality of service level provided while communicating with one or more of the remote devices.

In some embodiments, the event includes establishing or terminating a communication link with a remote device over one of the RF bands. In other embodiments, the event includes a requirement for searching for interfering radar transmissions in a given RF band, and the processor is configured to allocate one or more of the RF chains for detecting radar transmissions in the given RF band. In yet other embodiments, the processor is configured to re-allocate the resources by allocating one or more of the RF chains for performing spectrum sensing for detecting occupied channels in a given RF band.

There is additionally provided, in accordance with an embodiment that is described herein, a method for communication, including, in a wireless device including multiple Radio Frequency (RF) chains operating in multiple respective predefined RF bands and at least one RF chain is configurable to operate at a RF band selected from among the multiple predefined RF bands, multiple processing modules that process baseband signals communicated with the multiple RF chains, and a switching circuit that routes baseband signals between the RF chains and the processing modules, in accordance with a switch routing plan, in response to an event that warrants an operational reconfiguration of the wireless device, re-allocating resources of the wireless device including (i) allocating one or more of the RF chains to operate at one or more respective RF bands, (ii) allocating one or more of the processing modules to process baseband signals associated respectively with the one or more RF bands, and (iii) setting the switch routing plan to route baseband signals between pairs of RF chains and processing modules that were allocated to a common RF band. One or more remote devices are communicated with wirelessly, in accordance with the operational reconfiguration.

These and other embodiments will be more fully understood from the following detailed description of the embodiments thereof, taken together with the drawings in which:

DETAILED DESCRIPTION OF EMBODIMENTS

Overview

Figure 1:
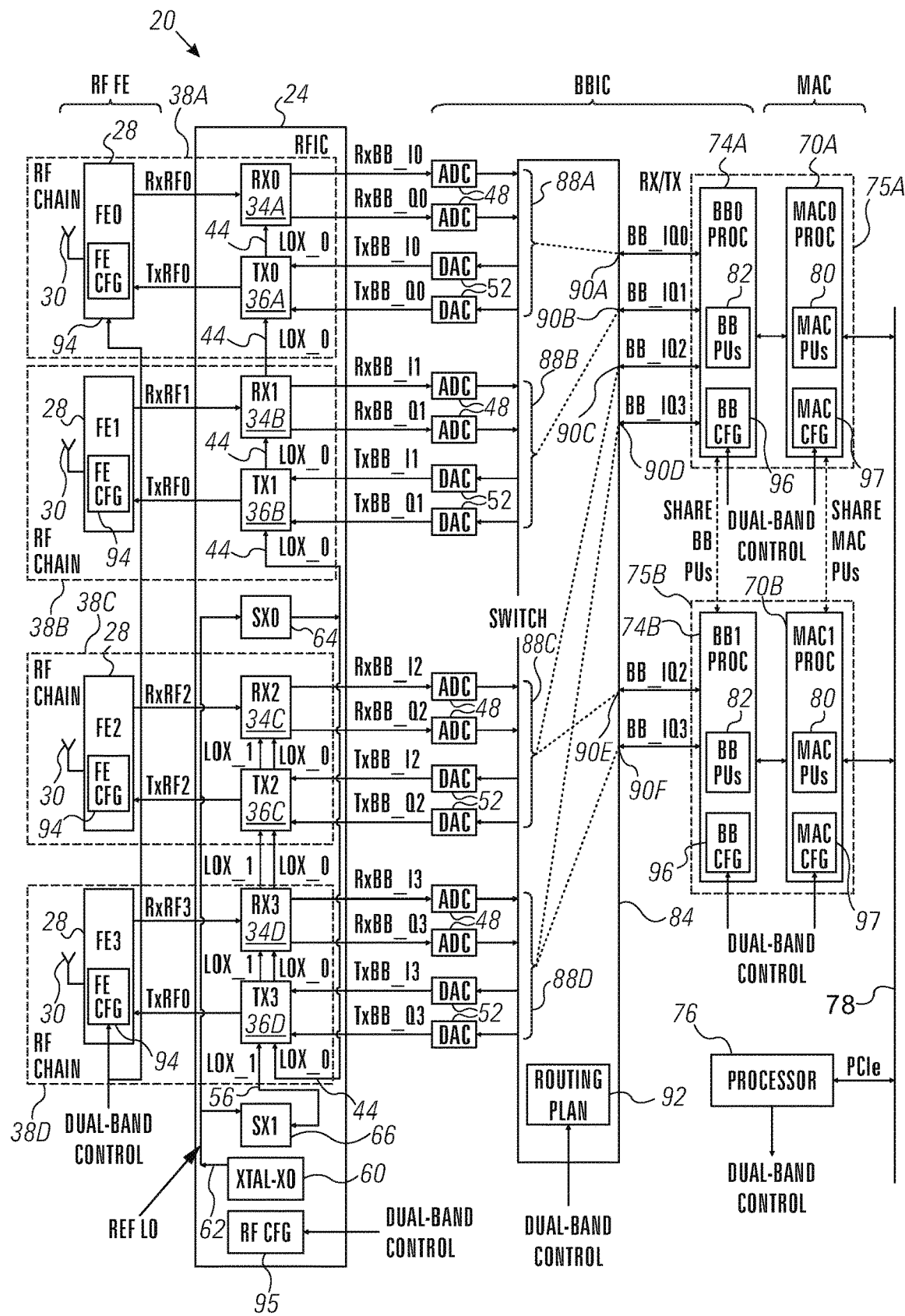
FIG. 1 is a block diagram that schematically illustrates a dual-band Wireless Local Area Network (WLAN) device, in accordance with an embodiment that is described herein.

Embodiments that are described herein provide systems and methods for dynamic reconfiguration of a wireless device operating concurrently over multiple frequency bands.

A wireless device such as a Multiple-In Multiple-Out (MIMO) Access Point (AP) typically comprises multiple antennas for transmitting signals to and receiving signals from wireless stations (STAs) in its vicinity. The AP comprises a transceiver comprising a transmission (TX) chain that up-converts baseband signals to a desired Radio Frequency (RF) band for transmission via the antennas, and a reception (RX chain) that down-converts to baseband RF signals received from the STAs via the antennas. In some embodiments, an antenna and an analog circuit associated with that antenna are referred to collectively as an "RF chain."

Some AP devices support a multi-band configuration over multiple separate RF bands. For example, a dual-band Wi-Fi AP may support two frequency bands specified in the 802.11 family of standards, e.g., the 2.4 GHz and 5 GHz frequency bands. In a concurrent mode of operation, a multi-band wireless device supports two-way communication over multiple frequency bands, simultaneously. A dual-band AP, for example, provides two separate and independent wireless networks, each of which operating over its own dedicated RF band.

A multi-band AP provides a total bandwidth that is typically much larger than the bandwidth available in a single-band configuration. Moreover, since the multiple RF bands occupy separate frequency ranges, concurrent communication over these RF bands typically cause little or no mutual interference among the RF bands.

In principle, a non-modifiable operational configuration may be determined, at design or manufacture time, for allocating each of the RF chains to one of the available RF bands. Such a rigid configuration, however, cannot adapt to varying conditions such as varying channel capacity, a varying number of STAs served by the AP in each of the RF bands, the quality of service required in serving each STA and the like. Rigid configuration therefore utilizes hardware and computational resources of the AP inefficiently, which may result in degraded performance and coverage.

In some embodiments, a wireless device comprises multiple RF chains operating in multiple respective predefined RF bands, wherein at least one RF chain is configurable to operate at a RF band selected from among the multiple predefined RF bands, and one or more processing modules configurable to process baseband signals communicated with the multiple RF chains. The wireless device further comprises a switching circuit that routes baseband signals between the RF chains and the one or more processing modules, in accordance with a switch routing plan.

The wireless device comprises a processor, which in response to an event that warrants an operational reconfiguration of the wireless device, re-allocates resources of the wireless device including (i) allocating one or more of the RF chains to operate at one or more respective RF bands, (ii) allocating one or more of the processing modules to process baseband signals associated respectively with the one or more RF bands, and (iii) setting the switch routing plan to route baseband signals between pairs of RF chains and processing modules that were allocated to a common RF band. Following reconfiguration, the wireless device communicates wirelessly with one or more remote devices in accordance with the updated operational reconfiguration.

Re-allocation of resources may be carried out in various ways. In an example embodiment, the processor may modify the number of RF chains allocated to a given RF band, e.g., by assigning an additional RF chain to the given RF band. In another embodiment, the processor re-allocates the resources by re-allocating a given RF chain from a first RF band to a second different RF band. In some embodiments, for efficient utilization of computational resources, the one or more processing modules share a pool of processing units, and the processor distributes computational load among the processing units. For example, the processor may re-allocate a given processing unit currently assigned to a processing module allocated to a given RF band, to another processing module allocated to a different RF band.

In some embodiments, the wireless device communicates with one or more remote devices over a given RF band in a beamforming mode. In such embodiments, the processor may modify the number of RF chains allocated to the given RF band for producing a desired transmission pattern.

As noted above, the processor modifies the operational configuration in response to a suitable event. The event may comprise, for example, identifying degradation in the quality of service level provided while communicating with one or more of the remote devices. As another example, the event comprises establishing or terminating a communication link with a remote device over one of the RF bands.

In some embodiments, the event comprises a requirement for executing some management operation in a given RF band. For example, in some embodiments, the wireless device operates in the given RF band, which may contain radar transmissions that may interfere with the wireless communication between the wireless device and the remote devices. In such embodiments, the management operation comprises searching for interfering radar transmissions in the given RF band, in which case the processor allocates one or more of the RF chains for detecting radar transmissions in the given RF band. As another example, in an embodiment, the given RF band is divided into multiple predefined channels, and the management operation comprises performing spectrum sensing for detecting one or more channels in the given RF band that are occupied by other wireless devices. In this embodiment, the processor may re-allocate one or more of the RF chains for performing the spectrum sensing operation in the given RF band.

In the disclosed techniques, hardware and computational resources of a wireless device are reallocated, on the fly, during field operation of the wireless device. This approach allows flexible adaptation of the wireless device resources to varying conditions and operational requirements. Moreover, superior quality of service and superior coverage can be achieved with limited resources, compared to wireless devices having a non-modifiable configuration. Alternatively, flexible configuration may achieve a desired performance level using less hardware and computational resources compared to a rigid configuration.

System Description

FIG. 1 is a block diagram that schematically illustrates a dual-band Wireless Local Area Network (WLAN) device 20, in accordance with an embodiment that is described herein. WLAN device 20 may operate as a WLAN Access Point (AP), a WLAN station (STA) or any other suitable type of WLAN device. In the present example, although not necessary, WLAN device 20 is configured to communicate with remote WLAN devices in accordance with a WLAN standard such as the family of the IEEE 802.11 standards, cited above.

In the present example, WLAN device 20 comprises a Radio Frequency Integrated Circuit (RFIC) 24, which is coupled to multiple Front End (FE) modules 28, e.g., four FE modules denoted FE0 . . . FE3. Each FE module 28 is coupled to a respective antenna 30, for transmitting and receiving WLAN signals. The multiple antennas can be used, for example, for communicating with other wireless devices in a Multiple-In Multiple-Out (MIMO) configuration. As will be described below, in the present example, the WLAN device supports flexible allocation of antennas 30 (and other physical and computational resources) between the two RF bands supported by the dual-band WLAN device. In general, the WLAN device may support flexible allocation of hardware and computational resources among a number of RF bands larger than two, e.g., among 2.4 GHz, 5 GHz and 6 GHz RF bands.

Each of FE modules 28 is coupled to a respective reception (RX) chain 34 and to a respective transmission (TX) chain 36. The FE module switches its antenna between the respective RX and TX chains. In FIG. 1, FE0 connects to reception chain RX0 (34A) and to transmission chain TX0 (36A), FE1 connects to reception chain RX1 (34B) and to transmission chain TX1 (36B) and so on. Example detailed block diagrams of FE 28, RX chain 34 and TX chain 36 will be described below with reference to FIG. 2.

In the context of the present disclosure and in the claims, the term "RF chain" refers to an antenna and an analog circuit associated with that antenna. In FIG. 1, for example, WLAN device 20 comprises four RF chains 38, each of which comprising an antenna 30, a FE module 28, a reception chain 34 and a transmission chain 36 that are associated with that antenna. In some embodiments, one or more elements, may be excluded from a given RF chain, e.g., a RF chain that requires functionality of reception only may be implemented without including a TX chain. In FIG. 1, RF chains 38A . . . 38D are depicted using dotted lines. The term "RF chain" may refer to various combinations of elements such as an antenna 30 plus FE 28, an antenna 30 plus a RX chain 34 and a TX chain 36, or an antenna 30 plus a FE 28, a RX chain 34 and a TX chain 36. In some embodiments, one or more elements of a RF chain are dynamically configurable to operate in one of multiple predefined RF bands. Alternatively, a RF chain may comprise elements that support only a single RF band.

Consider transmit and receive paths in the analog domain related to the FE modules and the RX and TX chains, as described, for example, with reference to FE0, RX0 and TX0 in FIG. 1. In the receive direction, FE0 28 receives a RF signal via its antenna 30 and delivers a filtered version of that RF signal, denote RxRF0, to reception chain RX0 34A. In RX0, the RF signal is down-converted to baseband using a Local Oscillator (LO) signal 44 denoted LOX_0, to produce In-phase and Quadrature (I/Q) baseband signals denoted RxBB_I0 and RxBB_Q0, respectively. Each of the In-phase and Quadrature signals is sampled and converted to a digital form using a respective Analog to Digital Converter (ADC) 48.

In the transmit direction, In-phase and Quadrature baseband signals denoted TxBB_I0 and TxBB_Q0, respectively, each of which is produced using a respective Analog to Digital Converter (DAC) 52, are up-converted in transmission chain TX0 36A using LOX_0 signal 44, and combined to produce a transmission RF signal denoted TxRF0. Front end module FE0 filters the TxRF0 signal and transmits it via its antenna 30.

Similar reception paths and transmission paths apply to FE1, FE2 and FE3 plus their respective pairs of RX and TX chains RX1/TX1, RX2/TX2 and RX3/TX3.

In the present example, in RF chains 38C and 33D, the LO signal for performing down-conversion and up-conversion operations is selectable between LOX_0 (44) and another LO signal 56 denoted LOX_1. The frequencies of LO signals LOX_0 (44) and LOX_1 (56) are tuned for operating respectively in each of the RF bands supported by the dual-band device. An example circuit implementing LO selection will be described in FIG. 2 below.

RFIC 24 comprises a crystal oscillator 60 that produces a reference LO signal 62. A synthesizer module 64, denoted SX0, uses reference LO signal 62 for generating LOX_0 signal 44. Similarly, a synthesizer module 66, denoted SX1, uses reference LO signal 62 for generating LOX_1 signal 56. In some embodiments, synthesizer modules 64 and 66 are implemented using Phase Locked Loop (PLL) techniques.

In the example of FIG. 1, WLAN device 20 comprises multiple Medium Access Control (MAC) modules 70, multiple baseband (BB) modules 74, and a processor 76. A BB module is also referred to as a Physical-Layer (PHY) module. In the dual-band configuration of FIG. 1, MAC module 70A denoted MAC0 is coupled to BB module 74A denoted BB0, and MAC module 70B denoted MAC1 is coupled to BB module 74B denoted BB1. A pair of modules comprising a BB module and a MAC module, which are assigned together to a common RF band is also referred to herein as a "processing module." In FIG. 1, processing module 75A comprising BB0 and MAC0, and processing module 75B comprising BB1 and MAC1 are depicted using dotted lines.

In some embodiments, the BB module and the MAC module of a given processing module are allocated together to a given RF band.

MAC modules 70 are coupled to processor 76 via a bus or link 78. In the present example, link 78 comprises a Peripheral Component Interconnect Express (PCIe) bus. Alternatively, link 78 may comprise other suitable types of links.

In some embodiments, processor 76 carries out various tasks of the MAC modules such as controlling and scheduling the transmissions and receptions via the BB modules. Processing in MAC modules 70 may include, for example, estimation of a channel between antennas 30 of the WLAN device and antennas of a wireless remote device. Based on the estimated channel, the MAC module may apply a steering matrix to spatial streams to be transmitted via respective antennas. Processor 76 further carries out control tasks of the WLAN device such as dynamically configuring the WLAN device, e.g., by setting various configurable elements in the RF chains for achieving best performance in concurrent dual-band communication.

In some embodiments, each BB module 74 carries out baseband processing tasks such as mapping between bits carried in spatial streams and a suitable Quadrature-Amplitude Modulation (QAM) symbols, and modulation/demodulation of the QAM symbols over multiple sub-carriers using, for example, an Orthogonal Frequency-Division Multiplexng (OFDM) modulation scheme.

Each MAC module 70 and each BB module 74 supports handling up to a predefined maximal number of RF chains. In the example of FIG. 1, BB0 and MAC0 can handle concurrently up to four baseband signals received via RX chains RX0 ... RX3 and up to four baseband signals transmitted via TX chains TX0 ... TX3. This means that BB0 can handle a full MIMO configuration of four antennas in the RF band associated with the LO signal LOX_0. In the present example, BB1 and MAC1 are required to handle concurrently up to two baseband signals received via RX chains RX2 and RX3 and up to two baseband signals transmitted via TX chains TX2 and TX3.

In the transmit direction, a BB module 74 processes spatial streams for transmission via selected TX chains and respective antennas. In some embodiments, the BB module applies beamforming to the spatial streams, by setting certain gains and phases to the signals transmitted via the TX chains, to spatially control the transmission. In the receive direction, the BB module processes signals received via one or more antennas 30 and respective RF chains, and extracts from the received signals information, such as data and sounding feedback information.

In the example of FIG. 1, each MAC module 70 comprises one or more MAC Processing Units (PUs) 80 and each BB module 74 comprises one or more BB PUs 82. In some embodiments, one or more MAC PUs can be dynamically allocated by processor 76 to either MAC0 or MAC1. Similarly, one or more BB PUs can be dynamically allocated to either BB0 or BB1. In these embodiments, at least some of the MAC PUs are not tied to a specific MAC module but serve as a pool of MAC PUs for both MAC0 and MAC1. Similarly, at least some of the BB PUs are not tied to a specific BB module but serve as a pool of BB PUs for both BB0 and BB1.

WLAN device comprises switching circuit 84 that mediates between the RX and TX chains and the BB modules. Switching circuit 84 is also referred to herein as a "switch" for brevity. The switching circuit comprises ports 88A ... 88D for connecting to the RF chains via ADCs 48 and DACs 52. The switching circuit further comprises ports 90A ... 90D for connecting to BB modules 74A and 74B. In the example of FIG. 1, ports 88A ... 88D are connected to RF chains 38A ... 38D, respectively, ports 90A ... 90D are connected to BB0, and ports 90E and 90F are connected to BB1.

The switching circuit handles data signals belonging to a data plane, wherein the data signals comprising data samples of the In-phase and Quadrature BB signals. In some embodiments, a control plane in WLAN device 20 comprises control signals that control the operation of switching circuit 84, ADCs 48, DACs 52, FEs 28 and RFIC 24. The switching circuit routes at least some of the control signals of the control plane to the relevant elements, such as RFIC 24, FEs 28, DACs 52 and ADCs 48. In FIG. 1, the control signals of the switch, RFIC (including the RX and TX chains) and FEs are collectively denoted "dual-band control."

In some embodiments, the RFIC measures the power of the received signals and provides Received Signal Strength Indicator (RSSI) measurements to the switching circuit, which routes the RSSI measurements to the relevant BBs.

In some embodiments, the switching circuit routes data signals between ports 88 and ports 90 in groups of four signals, wherein each such group of four signals corresponds to a respective RF chain. Specifically, each port 88 receives an In-phase signal and a Quadrature signal from a respective RX chain 34 via ADCs 48, and routes an In-phase signal and a Quadrature signal to a TX chain 36 (of the same RF chain) via DACs 52.

In a given routing configuration of the switching circuit, the switching circuit interconnects four data signals between each port 88 and a selected port 90. In FIG. 1, interconnections between ports 88 and ports 90 within the switching circuit are depicted as dotted lines.

Switching circuit 84 comprises a routing plan 92 that specifies modifiable interconnections between ports 88 and ports 90. In some embodiments, routing plan 92 may specify both fixed and modifiable interconnections. In FIG. 1, the routing plan may specify interconnecting between port 88C and one of ports 90C and 90E, and interconnecting between port 88D and one of ports 90D and 90F. Further in FIG. 1, the interconnections between port 88A and port 90A, and between port 88B and port 90B are fixed.

Let BAND0 and BAND1 denote the two RF bands supported by the dual-band WLAN device of the present example. In some embodiments, BB0 and BB1 are configured to process baseband signals associated with BAND0 and BAND1, respectively. In accordance with the routing plan supported by switching circuit 84, RF chains (or their FEs) may be allocated to the RF bands in various configurations as follows:

TABLE 1

Supported allocations of RF chains (or FEs) to RF bands

| FE0 | FE1 | FE2 | FE3 | FEs/BAND0 | FEs/BAND1 |
| --- | --- | --- | --- | --- | --- |
| BAND0 | BAND0 | BAND0 | BAND0 | 4 | 0 |
| BAND0 | BAND0 | BAND0 | BAND1 | 3 | 1 |
| BAND0 | BAND0 | BAND1 | BAND0 | 3 | 1 |
| BAND0 | BAND0 | BAND1 | BAND1 | 2 | 2 |

In the example of FIG. 1, the RF chains of FE0 and FE1 support only one RF band. On the other hand, the RF chains of FE2 and of FE3 support both RF bands.

In general, the WLAN device may be implemented using FEs that support a single RF band, FEs that support multiple RF bands, or a combination of FEs of both types. For example, when using FEs that each supports a single RF band, multiple FEs for each RF band may be required. In such cases, RX and TX chains tuned to the relevant RF bands are connected dynamically to the FEs. In this configuration, RX chains and TX chains are flexibly connected to the FEs (not shown) rather than using a rigid connection between FEs and RX/TX chains as in the WLAN device of FIG. 1. In an example embodiment, in a dual-band WLAN device supporting the 2.4 GHz and 5 GHz RF bands, the TX chain has switchable RF outputs for the two RF bands and the RF chain has switchable RF inputs for the two RF band. When the WLAN device is implemented using FEs that support a single RF band, the 2.4 GHz output of the TX chain is connected to a FE that supports the 2.4 GHz band, and the 5 GHz output of the TX chain is connected to a FE that supports the 5 GHz band. When the WLAN device is implemented using FEs that support multiple RF bands, both the 2.4 GHz and the 5 GHz outputs of the TX chain are connected to a common FE that supports both RF bands. Similar schemes apply to connecting FEs to RF chains.

In some embodiments, at least some of the RF chains, including FEs 28 and their Rx and TX chains, are configurable to operate at a selected RF band BAND0 or BAND1. To this end, the FE module comprises a FE configuration module 94, and RFIC 24 comprises a RF configuration module 95, which are controlled by processor 76, and may be implemented using any suitable type of storage element such as a register or a nonvolatile memory. Example controllable RF chains will be described with reference FIG. 2 below.

In some embodiments, each BB module 74 comprises a BB configuration module 96, and each MAC module 70 comprises a MAC configuration module 97. BB configuration modules 96 and MAC configuration modules 97, are controlled by processor 76 and may be implemented using any a storage element of any suitable type such as a register or a nonvolatile memory. In some embodiments, a BB configuration allocates each of BB0 and BB1 to a respective RF band. Similarly, a MAC configuration module allocates each of MAC0 and MAC1 to a respective RF band.

In some embodiments, at least one BB PU can be shared among multiple BB modules. For example, BB0 and BB1 may share a pool of four BB PUs that may be allocated to the BB modules as required, e.g., based on the number of the RF chains respectively routed to the BB modules. Similarly, at least one MAC PU may be shared among multiple MAC modules. For example, MAC0 and MAC1 may share a pool of four mac PUs that may be allocated to the MAC modules as required, e.g., based on the processing load assigned to each of the MAC modules.

Figure 2:
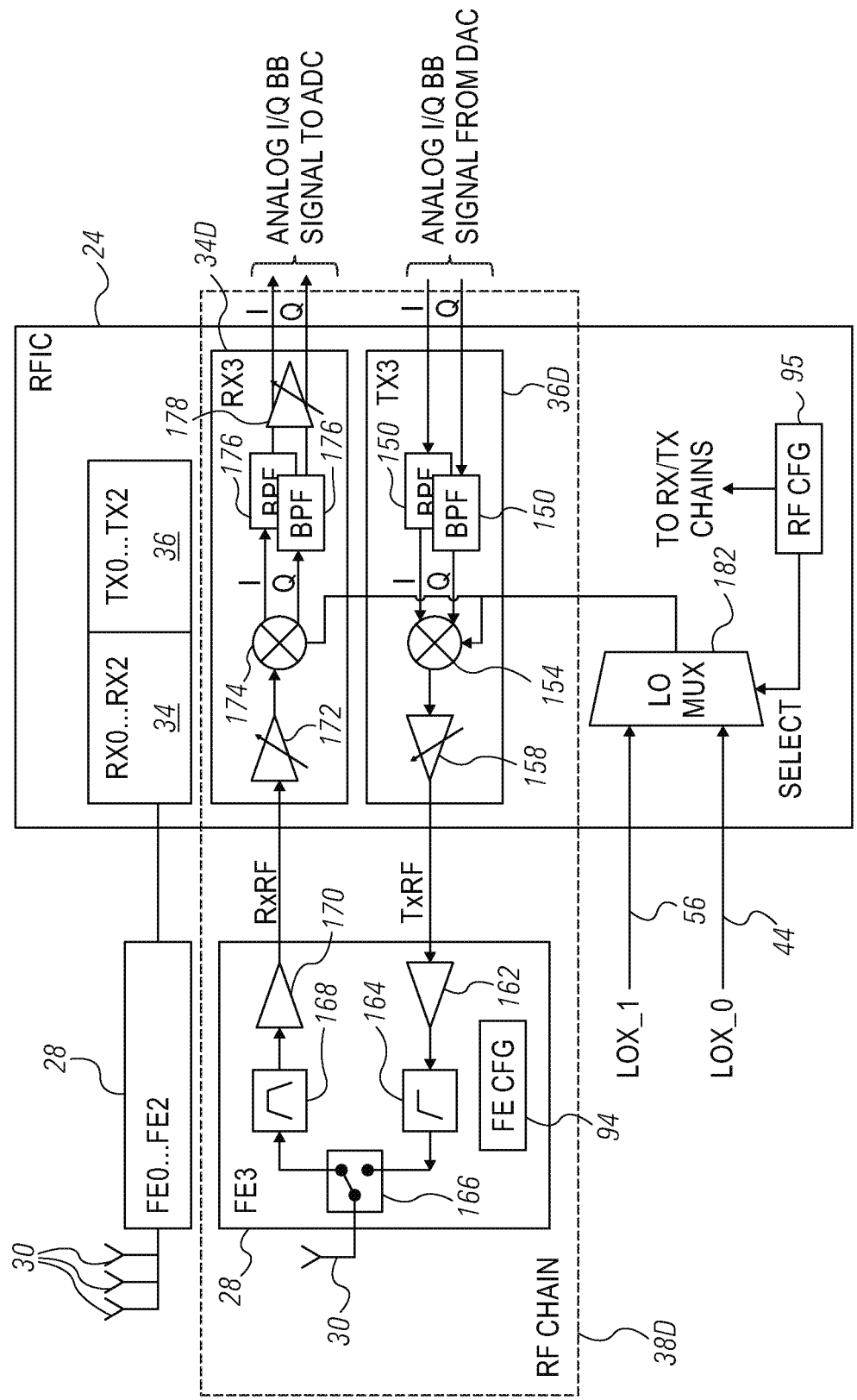
FIG. 2 is a block diagram that schematically illustrates a configurable RF chain in a dual-band WLAN device, in accordance with an embodiment that is described herein.

FIG. 2 is a block diagram that schematically illustrates a configurable RF chain in a dual-band WLAN device, in accordance with an embodiment that is described herein. FIG. 2 depicts elements of configurable RF chain 38D in detail, and only main elements, e.g., FE 28, RX chain 34 and TX chain 36 of the other RF chains (38A . . . 38C) of FIG. 1.

In the transmit direction, TX3 (36D) receives from a BB module 74 an I/Q baseband signal for transmission, which was converted into an analog signal using DACs 52. In TX3, Band-Pass Filters (BPFs) 150 filter the analog signal, a mixer 154 up-converts the signal to RF (and combines the I and Q components of the signal), and an amplifier 158 amplifies the RF signal. In the respective front-end module FE3, the RF signal is amplified with a Power Amplifier (PA) 162, filtered with a Low-Pass Filter (LPF) 164, and provided via a TX/RX switch 166 to antenna 30.

In the receive direction, antenna 30 receives a RF signal, and the signal passes through the TX/RF switch and is filtered by a filter 168. A Low-Noise Amplifier (LNA) 170, referred to as an external LNA, amplifies the signal before providing it to the corresponding RX3 chain (34D) in RFIC 24. In RX3, the signal is amplified by an additional LNA 172, referred to as an internal LNA. A mixer 174 down-converts the RF signal to baseband and splits it to I and Q components, bandpass filters 176 filter the down-converted I/Q signal, and the I/Q signal is then amplified by a Variable-Gain Amplifier (VGA) 178. The I/Q baseband signal is then provided to a relevant BB module 74 after conversion to a digital signal using ADCs 48.

As noted above RF chains 38C and 38D are configurable. In FE3, for example, filters 164 and 168 have respective frequency responses that can be modified on the fly by processor 76 modifying the setting of FE configuration module 94. In some embodiments, processor 76 controls the respective frequency responses of filters 164 and 168 based on the RF band selected for the RF chain in question. In some embodiments, each of filters 164 and 168 comprises multiple filters corresponding to the multiple RF bands, and FE configuration module 94 holds information for selecting a filter 164 and a filter 168 depending on the relevant RF band.

In RF chain 38D (and 38C), the RX chain and the TX chain support both RF bands of the dual-band device. In FIG. 2, RFIC 24 comprises a LO multiplexer 182 that is controlled by RF configuration module 95. The LO multiplexer selects one of LO signals LOX_0 (44) and LOX_1 (56), by setting RF configuration module 95 in accordance with the RF band selected. In some embodiments, the RFIC comprises multiple LO multiplexers 182, each associated with a respective RF chain.

The RF chain configuration in FIG. 2 is given by way of example, and other suitable RF chain configurations can be used. For example, other suitable combinations of filters and amplifiers can also be used.

The configurations of WLAN device 20 shown in FIG. 1 and of the configurable RF chain shown in FIG. 2 are example configurations, which is chosen purely for the sake of conceptual clarity. In alternative embodiments, any other suitable WLAN device configuration and RF chain configuration can be used. For example, WLAN device 20 may comprise any suitable number of RF chains, each comprising a FE, a Rx chain and possibly a TX chain. The various reception and transmission paths in WLAN device 20 of FIG. 1 are implemented in an In-Phase/Quadrature (I/Q) configuration. Alternatively, some or all of the reception and/or transmission paths may be implemented using low IF configuration with a single real BB signal.

In some embodiments, the functionalities of ADCs 48 DACs 52, switching circuit 84 and BB modules 74 are implemented in a common IC referred to as a Baseband Integrated Circuit (BBIC).

The division of functions among the FE modules, RFIC, BBIC and/or MAC may differ from the division shown in FIG. 1. The RFIC and BBIC may be integrated in a single device (e.g., on a single silicon die) or implemented in separate devices (e.g., separate silicon dies). Further alternatively, the entire functionality of the FE modules may be implemented in the RFIC, or WLAN device 20 may be implemented without a RFIC. In the FE modules, filter 168 may be inserted after LNA 170 rather than before the LNA. In other configurations, filter 168 and/or LNA 170 may be omitted.

The different elements of WLAN device 20 may be implemented using suitable hardware, such as in one or more RFICs, Application-Specific integrated Circuits (ASICs) or Field-Programmable Gate Arrays (FPGAs). In some embodiments, some elements of WLAN device 20, e.g., processor 76, can be implemented using software, or using a combination of hardware and software elements. Elements of WLAN device 20 that are not mandatory for understanding of the disclosed techniques have been omitted from the figure for the sake of clarity.

In some embodiments, processor 76 is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. This processor may be internal or external to the BBIC.

Dynamic Reconfiguration of Dual-Band WLAN Device

Figure 3:
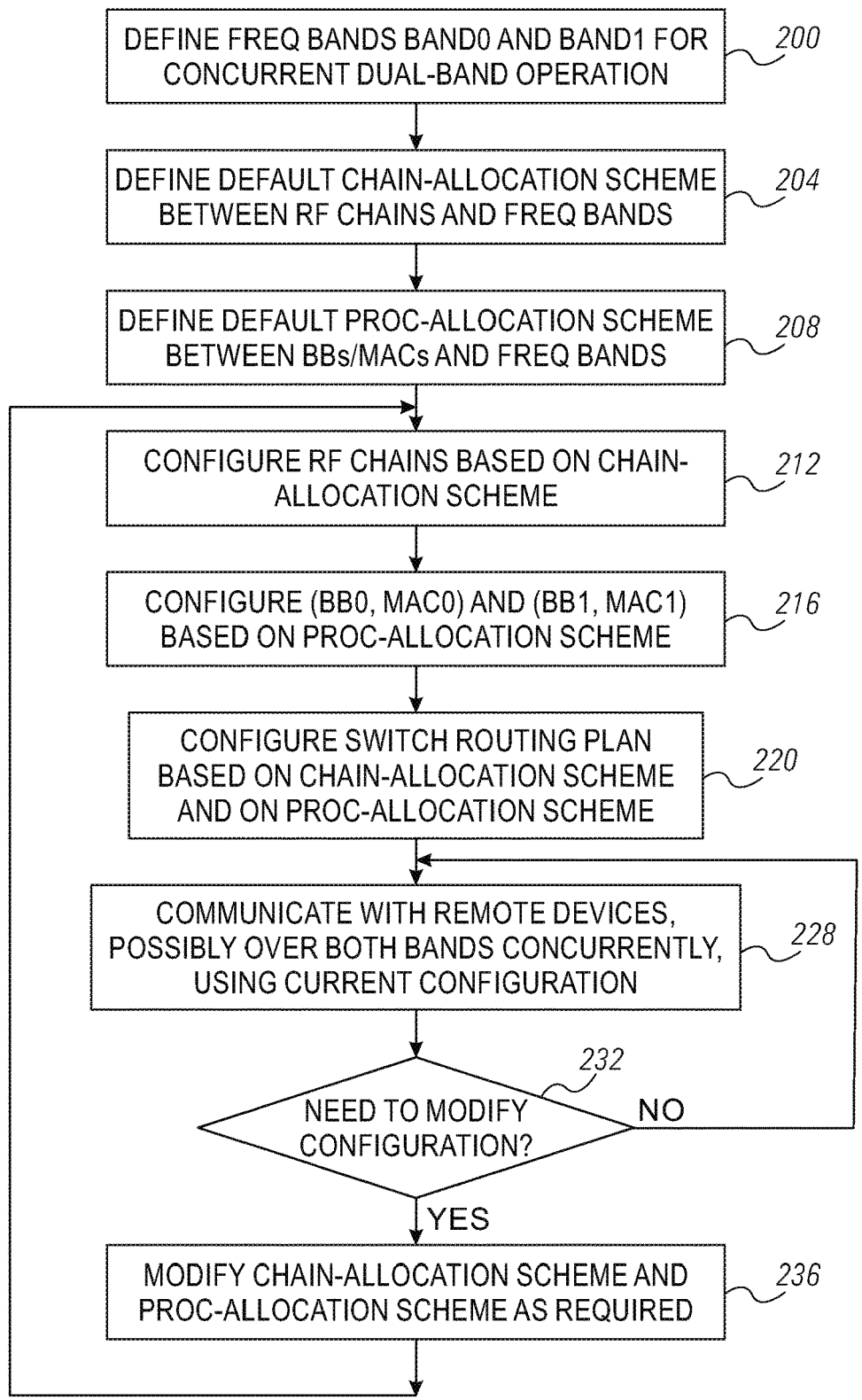
FIG. 3 is a flow chart that schematically illustrates a method for dynamic reconfiguration of a dual-band WLAN device, in accordance with an embodiment that is described herein.

FIG. 3 a flow chart that schematically illustrates a method for dynamic reconfiguration of a dual-band WLAN device, in accordance with an embodiment that is described herein. The method will be described as executed by WLAN device 20 of FIG. 1, including processor 76.

The method begins with processor 76 defining two RF bands for concurrent dual-band operation, at a RF bands definition step 200. The two RF bands supported by the dual-band device are denoted BAND0 and BAND1. For example, in a Wi-Fi device, the available RF bands may comprise the 2.4 GHz band and the 5 GHz band specified in the IEEE 802.11 family of standards. Alternatively, other RF bands of the IEEE 802.11 standards such as 900 MHz, 3.6 GHz, 4.9 GHz, 5.9 GHz and 60 GHz can also be used.

In the present example, the processor holds a chain-configuration scheme that defines which RF chain 38 is allocated to each RF band, and a processing-configuration scheme that defines which processing module 75 is allocated to each RF band. In some embodiments, to apply a chain-configuration scheme, the processor sets FE configuration module 94 and RF configuration module 95, in each configurable RF chain, in order to configure the RF chain to operate an the relevant RF band. The overall configuration of the RF chains 38, switching circuit 84 and processing modules 75, is also referred to herein as an "operational configuration."

At a default chain allocation step 204, the processor defines a default chain-allocation scheme. For example, the default chain-allocation scheme allocates RF chains 38A and 38B to BAND0 and allocates RF chains 38C and 38D to BAND1. In the example of WLAN device 20, RF chain 38A comprising FE0 and RF chain 38B comprising FE1 support up-conversion and down-conversion using a single LO signal—LOX_0, and therefore the chain-allocation scheme may assign each of RF chains 38A and 38B only to BAND0.

Note that in some cases, one or more RF chains may remain unused. For example, when the WLAN device communicates with a single remote device over one of the RF bands, it may be sufficient to allocate for this RF band only three RF chains, in which case the fourth RF chain may remain unused.

At a default processing allocation step 208, the processor defines a default processing-allocation scheme. For example, the default processing-allocation scheme allocates processing module 75A (BB0 and MAC0) to BAND0, and allocates processing module 75B (BB1 and MAC1) to BAND1.

At a chain configuration application step 212, the processor applies the current chain-allocation scheme to RF chains 38, by configuring FEs 28, RX chains 34 and TX chains 36, in accordance with the RF bands allocated. Specifically, in FEs 28, the processor sets FE configuration module 94 to configure filters 168 and 164 to respective frequency responses that match the RF bands to which the RF chains were respectively allocated. In RX chains 34 and in TX chains 36, the processor configures RF configuration module 95 to select LOX_0 or LOX_1, for the respective RF bands BAND0 or BAND1.

At a processing configuration application step 216, the processor configures each of Processing modules 75A (BB0, MAC0) and 75B (BB1, MAC1) to process baseband signals and manage communication related to one of BAND0 and BAND1. As will be described below, the processor may configure processing modules 75 to share computational resources between BB0 and BB1 and between MAC0 and MAC1.

At a switching circuit configuration step 220, the processor configures routing plan 92 so that the switching circuit routes baseband signals between RF chains 38 and processing modules 75 that were allocated to a common RF band. For example, assuming that RF chain 38C and processing module 75 were allocated to BAND0 and that RF chain 38D and processing module 75B were allocated to BAND1, the processor configures the switching circuit with a routing plan that routes between port 88A and 90A, port 88B and 90B, port 88C and 90C and between port 88D and port 90F of the switching circuit.

At a wireless communication step 228, the WLAN device communicates with one or more remote devices using the operational configuration set by the processor at steps 212, 216 and 220 above. In an embodiment, the WLAN device communicates with multiple remote devices, wherein at least two of these remote devices operate over different RF bands. In such embodiments, the WLAN device communicates with the multiple remote devices over both BAND0 and BAND1, concurrently.

At a modification checking step 232, the processor checks whether the currently used operational configuration needs to be modified, and if not, loops back to step 228 to continue communicating using the current operational configuration. Otherwise, the processor modifies the chain-allocation scheme, the processing-allocation scheme, or both, as required, at a reconfiguration step 236. The processor may also modify the routing plan of switching circuit 84, as required. The processor then loops back to step 212 to apply the updated chain-configuration scheme, processing-allocation scheme and switching circuit, by executing steps 212, 216 and 220, as described above.

The processor may modify the chain-allocation scheme at step 236 in various ways. In an example embodiment, the processor may modify the number of RF chains allocated to a given RF band. In another example embodiment, the processor may re-allocate a given RF chain from one RF band to a different RF band.

At step 232 above, various types of events may require a modification to the currently used operational configuration. The processor may be informed of the event, e.g., by an element coupled to link 78, e.g., a MAC module or an external host (not shown). Alternatively, the processor itself identifies an event that requires configuration modification and responses accordingly. Example events are listed below:

The communication performance of the WLAN device with a remote device has degraded below a required quality of service level, e.g., because of varying channel conditions. The communication performance may be improved by increasing the number of RF chains allocated to the relevant RF band.

The WLAN device operates in a multi-user mode, and a communication link with a remote device over a given RF band is established or terminated. In this case, the processor may allocate a RF chain to the given RF band or de-allocate a RF chain from the given RF band.

The WLAN device applies beamforming in a given RF band using multiple RF chains (or antennas). The number of RF chains assigned to the given RF band may be modified by the processor for achieving a desired transmission pattern.

The WLAN device is required to perform a management operation in a given RF band, which requires the usage of one or more RF chains. In some embodiments, the given RF band is divided into multiple communication channels, and the management operation may comprise, for example, spectral sensing for detecting channels in the given RF band that are occupied by other WLAN devices. In some embodiments, the given RF band may contain radar transmission that interfere with the wireless communication between the WLAN device and remote devices. In such embodiments, the management operation comprises searching for interfering radar transmissions in the given RF band. In these embodiments (e.g., implementing spectrum sensing and/or radar detection), the processor may allocate, at least temporarily, one or more RF chains for performing the desired operation in the given RF band.

In some embodiments, the processor transmits a sounding packet, e.g., a Non Data Packet. (NDP) over one or more of the RF bands to be used. Using the NDP, a beamformer (e.g., the AP) may acquire channel state information from each Tx chain of the Beamformer to each Rx chain of the beamformee (e.g., remote STA). The remote devices typically respond to the sounding packet by transmitting back to the WLAN device information regarding the underlying communication channel. The processor typically transmits the sounding packet periodically, as well as shortly after configuring the various hardware elements as described at steps 212, 216 and 220 above, before starting the communication at step 228 using the updated operational configuration. This allows smooth transition to a different operational configuration.

Efficient Management of Processing Resources

In some embodiments, computational resources of the WLAN device may be managed efficiently by sharing processing units such as BB PUs 82 and MAC PUs 80 between processing modules 75A and 75B.

As noted above, in some embodiments, each BB module comprises one or more BB PUs 82. In some embodiments, a single BB PU can handle BB processing of the entire RF chains, in which case, each BB module may comprise a single BB PU. In other embodiments, a single BB PU cannot handle all the RF chains, in which case two or more BB PUs are required for handling all the RF chains in both RF bands.

Consider an example in which each BB PU can handle one RF chain, and therefore using four BB PUs is sufficient for handling four RF chains 38. In a naïve approach, using a fixed configuration of the BB PUs, processing modules 75A and 75B would comprise four BB PUs, and two BB PUs, respectively. This approach utilizes computational resources inefficiently. For example, when the four RF chains are allocated to processing module 75A, the two BB PUs in processing module 75B remain unused.

In some embodiments, one or more BB PUs may belong to a pool of BB PUs that can shared by processing modules 75. In the example above, a total number of four BB PUs can be used, wherein two BB PUs are used only by BB0 and each of the other two BB PUs can be used by each of BB0 and BB1, in accordance with the allocation of the processing modules to the RF bands. In this example, by sharing BB PUs, the total number of BB PUs reduces from six BB PUs to four BB PUs.

In some embodiments, MAC PUs 80 can be shared between processing modules 75, in a similar manner to sharing BB PUs as described above.

In some embodiments, the processing-allocation scheme of the method of FIG. 3, specifies the distribution of sharable BB PUs and sharable MAC PUs between the processing modules, depending on the number of RF chains to be handled in the respective processing modules.

The embodiments described above are given by way of example, and other suitable embodiments can also be used. For example, although the embodiments described above refer mainly to a dual-band device, the disclosed embodiments are also applicable to a multi-band device operating concurrently over a number of RF bands higher than two.

In the embodiments described above separate BB modules and MAC modules are allocated to the different RF bands. In alternative embodiments, a single BB module and a single MAC module handle the multiple RF bands, e.g., by logically assigning processing resources to the RF bands.

The embodiments described above refer mainly to a configuration in which, multiple processing modules (e.g., 75A and 75B) are allocated for processing multiple RF bands. This is not mandatory, and in alternative embodiments, a single processing module may process multiple selected RF bands. In an example embodiment, WLAN device comprises a single MAC/PHY module that handles multiple selectable RF bands allocated to respective RF chains.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A wireless device, comprising:
   multiple Radio Frequency (RF) chains configured to operate in respective RF bands, selected from among at least a first RF band and a second RF band;
   a pool of baseband processing circuits configurable to process baseband signals communicated with the multiple RF chains;
   a switching circuit, configured to route baseband signals between the RF chains and the baseband processing circuits; and
   a processor, which is configured to allocate a first group of two or more of the RF chains to communicate with a remote device in the first RF band in a first beamforming mode and to allocate at least one of the baseband processing circuits to apply respective baseband signals to the RF chains in the first group while setting respective gains and phases of the respective baseband signals so as to generate a first transmission pattern toward the remote device, while allocating a second group of one or more of the RF chains to communicate in the second RF band,
   wherein the processor is configured to identify a change in a quality of service in communication with the remote device and, in response to the identified change, to reallocate at least one of the RF chains from the second group to the first group, and to cause one or more of the baseband processing circuits to modify the respective gains and phases of the respective baseband signals that are applied to the RF chains in the first group so as to generate a second transmission pattern, different from the first transmission pattern, toward the remote device.

2. The wireless device according to claim 1, wherein the processor is configured to reallocate resources of the wireless device during field operation of the wireless device.

3. The wireless device according to claim 1, wherein the change comprises a degradation in the quality of service provided while communicating with the remote device.

4. The wireless device according to claim 1, wherein the processor is further configured to reallocate one or more of the RF chains in response to establishing or terminating a communication link over one of the RF bands.

5. The wireless device according to claim 1, wherein the processor is further configured to search for interfering radar transmissions in a given RF band, and to reallocate one or more of the RF chains for detecting radar transmissions in the given RF band.

6. The wireless device according to claim 1, wherein the processor is further configured to reallocate one or more of the RF chains for performing spectrum sensing for detecting occupied channels in a given RF band.

7. A method for communication, comprising:
providing a wireless device comprising multiple Radio Frequency (RF) chains configured to operate in respective RF bands, selected from among at least a first RF band and a second RF band, a pool of baseband processing circuits configurable to process baseband signals communicated with the multiple RF chains, and a switching circuit, configured to route baseband signals between the RF chains and the baseband processing circuits;
allocating a first group of two or more of the RF chains to communicate with a remote device in the first RF band in a first beamforming mode;
allocating at least one of the baseband processing circuits to apply respective baseband signals to the RF chains in the first group while setting respective gains and phases of the respective baseband signals so as to generate a first transmission pattern toward the remote device;
allocating a second group of one or more of the RF chains to communicate in the second RF band;
after allocating the first and second groups of the RF chains and allocating the at least one of the baseband processing circuits, identifying a change in a quality of service in communication with the remote device; and
in response to the identified change, reallocating at least one of the RF chains from the second group to the first group, and causing one or more of the baseband processing circuits to modify the respective gains and phases of the respective baseband signals that are applied to the RF chains in the first group so as to generate a second transmission pattern, different from the first transmission pattern, toward the remote device.

8. The method according to claim 7, wherein the resources of the wireless device are reallocated during field operation of the wireless device.

9. The method according to claim 7, wherein identifying the change comprises identifying degradation in the quality of service provided while communicating with the remote device.

10. The method according to claim 7, and comprising reallocating one or more of the RF chains in response to establishing or terminating a communication link over one of the RF bands.

11. The method according to claim 7, and comprising searching for interfering radar transmissions in a given RF band, and reallocating one or more of the RF chains for detecting radar transmissions in the given RF band.

12. The method according to claim 7, and comprising reallocating one or more of the RF chains for performing spectrum sensing for detecting occupied channels in a given RF band.

* * * * *